(12) United States Patent
Kuriiwa et al.

(10) Patent No.: US 6,638,348 B2
(45) Date of Patent: Oct. 28, 2003

(54) METAL HYDRIDE TANK APPARATUS

(75) Inventors: Takahiro Kuriiwa, Saitama (JP);
Toshiaki Shimada, Saitama (JP);
Yoshio Nuiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/056,937

(22) Filed: Jan. 25, 2002

(65) Prior Publication Data

US 2002/0100369 A1 Aug. 1, 2002

(30) Foreign Application Priority Data

Jan. 26, 2001 (JP) ......................................... 2001-017833

(51) Int. Cl.[7] ................................................. F17C 11/00
(52) U.S. Cl. ............................. 96/146; 96/152; 206/0.7
(58) Field of Search .......................... 96/112, 139, 146, 96/152, 154; 206/0.7; 423/248, 648.1; 420/900; 502/526

(56) References Cited

U.S. PATENT DOCUMENTS

| | | | | |
|---|---|---|---|---|
| 2,989,383 A | * | 6/1961 | Miller | 422/200 |
| 4,609,038 A | * | 9/1986 | Ishikawa et al. | 165/104.12 |
| 4,928,496 A | * | 5/1990 | Wallace et al. | 62/46.2 |
| 4,946,485 A | * | 8/1990 | Larsson | 96/152 |
| 5,445,099 A | * | 8/1995 | Rendina | 114/140 |
| 6,015,041 A | * | 1/2000 | Heung | 206/70 |

FOREIGN PATENT DOCUMENTS

| | | | | |
|---|---|---|---|---|
| DE | 2928850 A | * | 1/1981 | |
| DE | 3150133 A1 | * | 7/1983 | |
| JP | 60-44698 A | * | 3/1985 | |
| JP | 61-45200 A | * | 3/1986 | |
| JP | 55-82900 A | * | 6/1998 | |
| JP | 11-060201 | | 3/1999 | |
| JP | 2000-120996 | | 4/2000 | |
| JP | 2000-170998 | | 6/2000 | |

* cited by examiner

Primary Examiner—Duane Smith
Assistant Examiner—Frank M. Lawrence
(74) Attorney, Agent, or Firm—Lahive & Cockfield, LLP (57) ABSTRACT

The object of the invention is to provide a high performance metal hydride tank apparatus, which is capable of discharging the hydrogen gas stored in the metal hydride in the tank from throughout the metal hydride efficiently and rapidly. In the process of the hydrogen gas discharge, the metal hydride contained near the inner circumferential surface of the tank absorbs the heats by the temperature raised tank and starts discharging the hydrogen gas. The discharged hydrogen gas absorbs the heat from the inner circumferential wall efficiently, flowing along the inner circumferential wall rapidly guided by the cylinder-like baffle. Further, the discharged hydrogen gas flows through the hydrogen gas flow channel, which is formed into sections by the cylinder-like baffle in the tank, and travels throughout the metal hydride, thus heating up the metal hydride rapidly and discharging the hydrogen gas efficiently from throughout the alloy.

12 Claims, 6 Drawing Sheets

METAL HYDRIDE TANK APPARATUS

FIELD OF THE INVENTION

The present invention relates to a metal hydride tank apparatus used for the hydrogen consuming apparatus such as fuel cells or hydrogen engines as a hydrogen supplier and more particularly relates to a metal hydride tank apparatus capable of efficiently discharging hydrogen gas, which is stored in the metal hydride in a tank, from throughout the metal hydride.

BACKGROUND OF THE INVENTION

In recent years, electric vehicles of various types, on which a traction motor instead of a conventional engine is mounted, have been developed. As one of these electric vehicles, fuel cell electric vehicles, which employ a fuel cell as a power supply for the traction motor, are being rapidly developed. The fuel cell generates electric power by an electrochemical reaction of hydrogen and oxygen in the air. The fuel cell includes an air supply apparatus for the continuous compressed air supply, an air discharging apparatus for discharging residual air, a hydrogen gas supplying apparatus for the continuous hydrogen gas supply, a hydrogen gas discharging apparatus for discharging and recirculating the residual hydrogen gas to the hydrogen gas supplying apparatus, and cooling apparatus for keeping the temperature of fuel cell within an appropriate range, which make up a fuel cell system to allow the fuel cell to generate electric power continuously.

In the hydrogen gas supplying apparatus in the fuel cell system, a reformer which generates hydrogen gas from a liquid fuel like methanol etc. containing hydrogen and a high pressure hydrogen tank storing highly pressurized hydrogen gas are normally provided as a hydrogen gas supplier. Also, a metal hydride tank is provided, which is capable of storing hydrogen gas in a low-pressure condition compared with a high pressure hydrogen tank. The metal hydride tank apparatus is composed of a metallic tank made of aluminum or stainless steel etc., which contains a metal hydride. The metal hydride tank apparatus is capable of storing hydrogen gas with the more compact tank compared with a high-pressure hydrogen tank.

The metal hydride contained in the metal hydride tank apparatus stores the hydrogen gas flowing into the tank with exothermic reaction and discharges the stored hydrogen gas with endothermic reaction. The metal hydride will promote the exothermic reaction to continue storing the hydrogen gas when the metal hydride is cooled, on the other hand the metal hydride will promote the endothermic reaction to continue discharging the hydrogen gas when the metal hydride is heated. So in this type of metal hydride tank apparatus, as a means for the control of storing or discharging the hydrogen gas by heating or cooling the metal hydride, a heating medium channel, for example, is provided in the tank (Japan Laid-Open Patents 11-60201, 2000-170998 and 2000-120996).

The metal hydride expands or contracts the volume of the metal hydride when the metal hydride stores or discharges the hydrogen gas, the repetition of which will make the particle of the metal hydride finer and degrade the thermal conduction of the metal hydride. The prior metal hydride tank apparatus, which merely has a heating medium channel in the tank, has difficulty in heating the whole metal hydride rapidly due to the degradation of thermal conduction, giving rise to the problem that the metal hydride cannot discharge the hydrogen gas efficiently and rapidly from throughout the metal hydride.

SUMMARY OF THE INVENTION

Therefore, the object of the present invention is to provide an efficient metal hydride tank apparatus capable of discharging the hydrogen gas stored in the metal hydride in the tank efficiently and rapidly from throughout the metal hydride.

The present invention to address the above issues provides a metal hydride tank apparatus containing a metal hydride, wherein a temperature controllable tank comprising; a metal hydride, which discharges the stored hydrogen gas according to the temperature control of the tank; a gas channel, which discharges the hydrogen gas, discharged from the metal hydride, out of the tank; a baffle, which is placed in the tank and forms the gas channel into sections to flow the hydrogen gas throughout the metal hydride in the tank and discharge the hydrogen gas out of the tank.

In the metal hydride tank apparatus according to the present invention, the metal hydride will store the hydrogen gas with exothermic reaction when the hydrogen gas comes into the tank. If the tank is temperature controlled to cool the metal hydride, the metal hydride will promote the exothermic reaction and continue storing the hydrogen gas coming into the tank. If the tank is temperature controlled to heat the metal hydride thereafter, the metal hydride will promote the endothermic reaction and continue discharging the stored hydrogen gas. Then, the hydrogen gas discharged from the metal hydride will be discharged out of the tank, flowing through the hydrogen gas channel formed into sections with baffles in the tank. In the process of the hydrogen gas discharge, the metal hydride contained near the inner circumferential wall of the tank absorbs heats from the temperature raised tank and initiates discharging. The hydrogen gas discharged near the inner circumferential wall of the tank flows along the inner circumferential wall of the tank rapidly and absorbs heats from the inner circumferential wall of the tank efficiently. Further the hydrogen gas flows throughout the metal hydride in the tank to heat up the metal hydride rapidly, thus discharging the hydrogen gas efficiently from throughout the metal hydride.

In the metal hydride tank according to the invention, the baffles may be of a cylinder-like shape placed in the longitudinal direction of the tank or of a spiral-like shape in the cross section normal to the longitudinal direction of the tank. Also in the Metal hydride tank apparatus according to the invention, when the honeycomb structured holder containing the metal hydride is housed so that the longitudinal direction of the holder lies in that of the tank, the baffle is placed at both ends of the holder to form the hydrogen gas flow channel into sections in the holder.

The baffles should preferably be made of a hydrogen impermeable material so that the hydrogen gas discharged from the metal hydride may flow along the hydrogen gas channel reliably. Further, the baffles should preferably be made of an elastic material so that they may be held by the inner circumferential wall of the tank with elastic contact to the inner circumferential wall of the tank.

DESCRIPTION OF THE PREFERRED EMBODIMENTS

Figure 1:
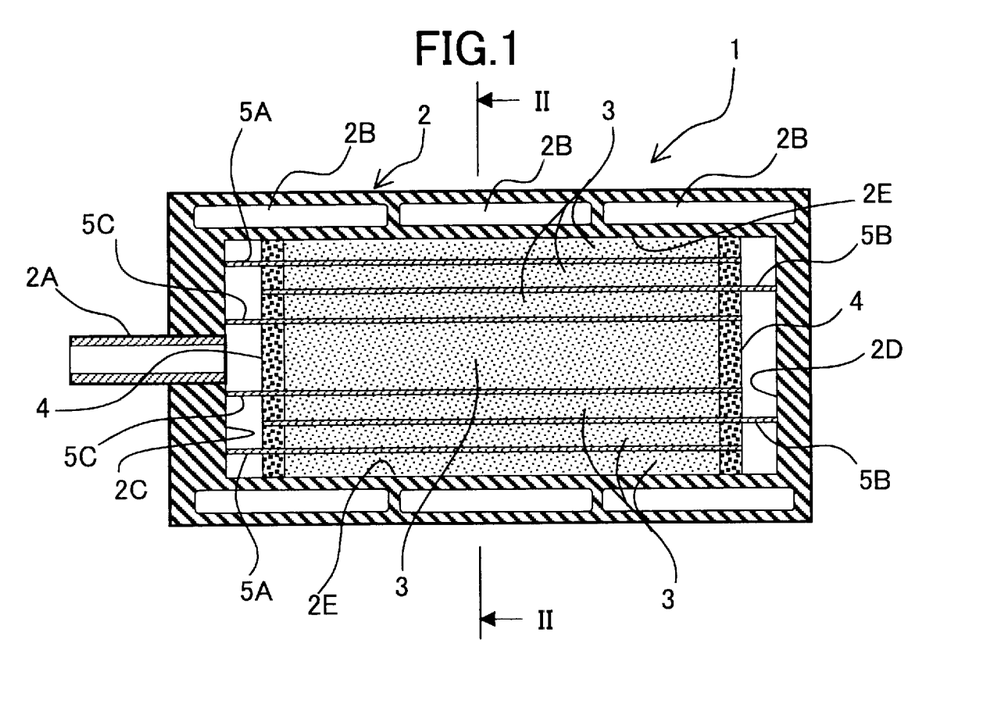
FIG. 1 is a longitudinal section view illustrating the inner structure of the metal hydride tank apparatus according to the first embodiment of the invention.
Figure 2:
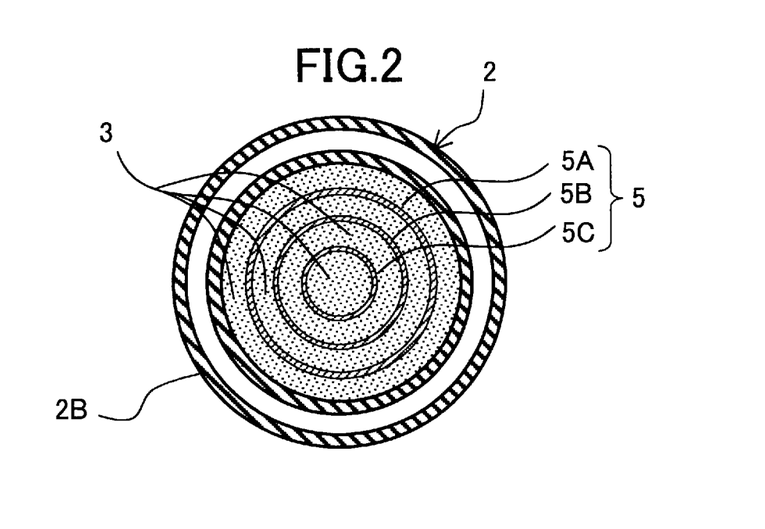
FIG. 2 is a cross sectional view of the metal hydride tank apparatus for line II—II of FIG. 1.
Figure 3:
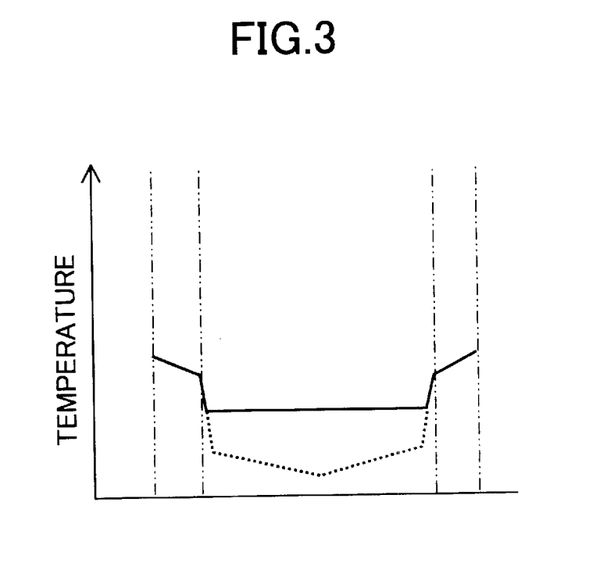
FIG. 3 is a figure showing the temperature gradient in the cross section of the metal hydride tank apparatus.

The preferred embodiment of the present invention will now be described in detail with reference to the accompanying drawings. FIG. 1 is a longitudinal section view illustrating the inner structure of the metal hydride tank apparatus according to the first embodiment of the invention. FIG. 2 is a cross sectional view of the metal hydride tank apparatus for line II—II of FIG. 1. FIG. 3 is a figure showing the temperature gradient in the cross section of metal hydride tank apparatus.

As shown in FIG. 1, a metal hydride tank apparatus 1 according to the first embodiment of the invention has a temperature controllable tank 2 containing a metal hydride 3. The metal hydride tank apparatus 1 is capable of storing the hydrogen gas coming into the tank 2 in the metal hydride 3 and discharging the stored hydrogen gas out of the tank 2 according to the temperature control of the tank 2.

The tank 2 is made of such a metal as stainless steel or aluminum alloy, which is of high thermal conduction. For example, the pressure tightness and air tightness of the tank 2 are provided so that the tank 2 can store the hydrogen gas in the metal hydride 3, which flows into with the pressure of 3–5 Mpa. The tank 2 is of a cylinder-like shape of 800 mm length, which has an inlet/outlet 2A serving as both an inlet and an outlet at the center of one end surface and has another closed end surface. The hydrogen gas is supplied into the tank 2 through the inlet/outlet 2A from a high pressure hydrogen tank (not shown). The high pressure hydrogen tank is made of fiber reinforced plastic (FRP), which can ensure the pressure tightness and air tightness and is loaded with hydrogen gas with the pressure of 25 Mpa while the volume is about 100 litters.

A water jacket 2B is provided in the circumferential wall of the tank 2 in order to control the temperature of the tank 2. The water jacket 2B is connected to the cooling apparatus of a fuel cell system (not shown) and the coolant which is radiated at a heat exchanger or heated by a fuel cell, is circulated switched as required in the water jacket 2B. When the hydrogen gas is stored in the metal hydride 3 in the tank 2, the coolant after heat radiation circulates in the water jacket 2B to promote the exothermic reaction of the metal hydride 3. On the other hand, when the hydrogen gas is discharged from the metal hydride 3, the coolant after heat absorption circulates to promote the endothermic reaction.

The metal hydride 3 has an initial particle size of 16 to 20 mesh and is contained between a pair of disk-like filters 4, which are fixed near the end surfaces of the tank 2. BCC alloys, $AB_2$ type alloys, $AB_5$ type alloys and Mg alloys can be used for the metal hydride 3. The metal hydride 3 made of BCC alloy stores 1.2 mol of hydrogen gas per 100 grams on condition that the inner pressure of the tank 2 is around 3 Mpa. The generated heat is 15 kj per 1 gram of hydrogen, which means the metal hydride 3 generates 15 kj of reaction heat when the metal hydride 3 stores 1 gram of hydrogen gas. If the tank 2 is cooled to absorb the reaction heat, the metal hydride 3 will continue storing the hydrogen gas.

The pair of filters 4 are made of a sintered metal such as aluminum alloy to allow the hydrogen gas to flow through. One filter 4 is placed to form a flow space for the hydrogen gas with one inner side wall 2C of the tank 2. Another filter 4 is placed to form a space for the hydrogen gas with the other inner side wall 2D of the tank 2.

As shown in FIG. 2, a cylinder-like baffle 5 is provide in the tank 2 to form the flow channel of hydrogen gas into sections, which is discharged from the particle-like metal hydride 3. The baffle 5 includes, for example, three diameter different cylinder-like baffles 5A, 5B and 5C, which are coaxially placed in the longitudinal direction of the tank 2. The baffles 5A, 5B and 5C are made of a hydrogen impermeable material such as aluminum alloy.

The filters 4 support the diameter wise large cylinder-like baffle 5A of the baffle 5. One end of 5A has a distance from one inner side wall 2D of the tank 2, and the other end contacts to the other inner side wall 2C, forming a section with the inner circumferential wall 2E for containing the particle-like metal hydride 3.

The filters 4 support the diameter wise medium size cylinder-like baffle 5B of the baffle 5. One end of 5B has a distance from one inner side wall 2C of the tank 2, and the other end contacts to the other inner sidewall 2D, forming a section with the diameter wise large baffle 5A for containing the particle-like metal hydride 3.

The filters 4 support the diameter wise small size cylinder-like baffle 5C of the baffle 5. One end of 5C contacts to one inner side wall 2C of the tank 2 around the inlet/outlet 2A, and the other end has a distance from the other inner side wall 2D, forming a section with the diameter wise medium baffle 5B for containing the particle-like metal hydride 3.

The diameter wise large, medium and small size cylinder-like baffles 5A, 5B and 5C of the cylinder-like baffle 5 flow the hydrogen gas, which is discharged from the metal hydride 3 contained near the inner circumferential wall 2E of the tank 2, along the inner circumferential wall 2E from one to the other end of the tank 2. The baffles flow the hydrogen gas throughout the metal hydride 3 by making the flow move reciprocally between the two ends of the tank 2 to direct the flow gradually toward the center of the tank 2, forming the hydrogen gas flow channel into sections so as to discharge the hydrogen gas out of the tank 2 through the inlet/outlet 2A.

The metal hydride tank apparatus 1 according to the first embodiment of the present invention is placed in the hydrogen gas supply apparatus of the fuel cell system (not shown) along with the high pressure hydrogen tank. The metal hydride tank apparatus 1 is used to supply the hydrogen gas stored in the metal hydride 3 to the fuel cell (not shown) by discharging the hydrogen gas out of the tank 2.

In the metal hydride tank apparatus 1 according to the first embodiment of the invention, the hydrogen gas flows into one end of the tank 2 through the inlet/outlet 2A, when the inlet/outlet 2A is connected to a hydrogen loading facility such as a hydrogen stand (not shown) etc. The hydrogen gas is guided by the diameter wise small baffle 5C, the diameter wise medium baffle 5B and the diameter wise large baffle 5A sequentially and stored in throughout the metal hydride 3. A coolant, which has radiated at the heat exchanger of the fuel cell system (not shown), circulates in the water jacket 2B of the tank 2 as a cooling medium for the metal hydride 3. Therefore, the metal hydride 3 is cooled by the inner circumferential wall 2E of the tank 2, thus storing the hydrogen gas continuously with the promotion of the exothermic reaction resulting from the hydrogen gas absorption.

In the metal hydride tank apparatus 1, in which the hydrogen gas is stored in throughout the metal hydride 3, the stored hydrogen gas is discharged out of the tank 2 and supplied to the fuel cell, when the inlet/outlet 2A is connected to the fuel cell of the fuel cell system (not shown). A coolant, which has absorbed heats from the fuel cell with the cooling apparatus of the fuel cell system (not shown), circulates in the water jacket 2B of the tank 2 as a heating medium for the metal hydride 3. Therefore, the metal hydride 3 is heated by the inner circumferential wall 2E of the tank 2, thus discharging the hydrogen gas continuously with the promotion of the endothermic reaction resulting from the hydrogen gas discharge.

In the Metal hydride tank apparatus 1 according to the first embodiment of the invention, the hydrogen gas discharged from the metal hydride 3 will flow through the hydrogen gas flow channel formed into sections by the diameter wise large, medium and small cylinder-like baffles 5A, 5B and 5C, and go out of the tank 2. In this hydrogen gas discharging process, the metal hydride 3 contained near the inner circumferential wall 2E of the tank 2 is heated by the inner circumferential wall 2E to start discharging the hydrogen gas. The hydrogen gas discharged near the inner circumferential wall 2E of the tank 2 absorbs the heats from the inner circumferential wall 2E efficiently, moving along the inner circumferential wall 2E rapidly from one to the other end of the tank 2 guided by the diameter wise large cylinder-like baffle 5A. The sufficiently heated hydrogen gas moves from one to the other end of the tank 2 reciprocally guided by the cylinder-like baffles 5A, 5B and 5C, flowing rapidly toward the center of the tank 2 through the long hydrogen gas flow channel. Thereby, the hydrogen gas will flow throughout the metal hydride 3 and heat the metal hydride 3 rapidly. Therefore, the metal hydride 3 will discharge the hydrogen gas from throughout the metal hydride 3 efficiently and rapidly. In this connection, the temperature gradient in the cross section of the metal hydride tank apparatus is like the solid line in FIG. 3. It shows that the temperature of the metal hydride 3 is raised more uniformly than the example of the prior art shown with the broken line. The heat transfer from the inner circumferential wall 2E of the tank 2 to the metal hydride 3 has been improved to around 350 kcal/h/m$^2$/deg C. for hydrogen storing and 180 kcal/h/m$^2$/deg C. for hydrogen discharge, compared with the prior values, 300 kcal/h/m$^2$/deg C. and 60 kcal/h/m$^2$/deg C. respectively.

The metal hydride tank apparatus 1 according to the first embodiment of the invention is capable of discharging the hydrogen gas stored in the metal hydride 3 of the tank 2 from throughout the metal hydride 3 efficiently and rapidly, thus enabling the improvement of the hydrogen gas discharge. Therefore, the metal hydride tank apparatus 1 will lead to the increase in the discharge amount of the hydrogen gas compared with the prior metal hydride tank apparatus and allow making the tank 2 more compact than the prior ones. The metal hydride tank apparatus 1 will be much beneficial as a hydrogen supplier for the fuel cell of fuel cell vehicles.

Figure 4:
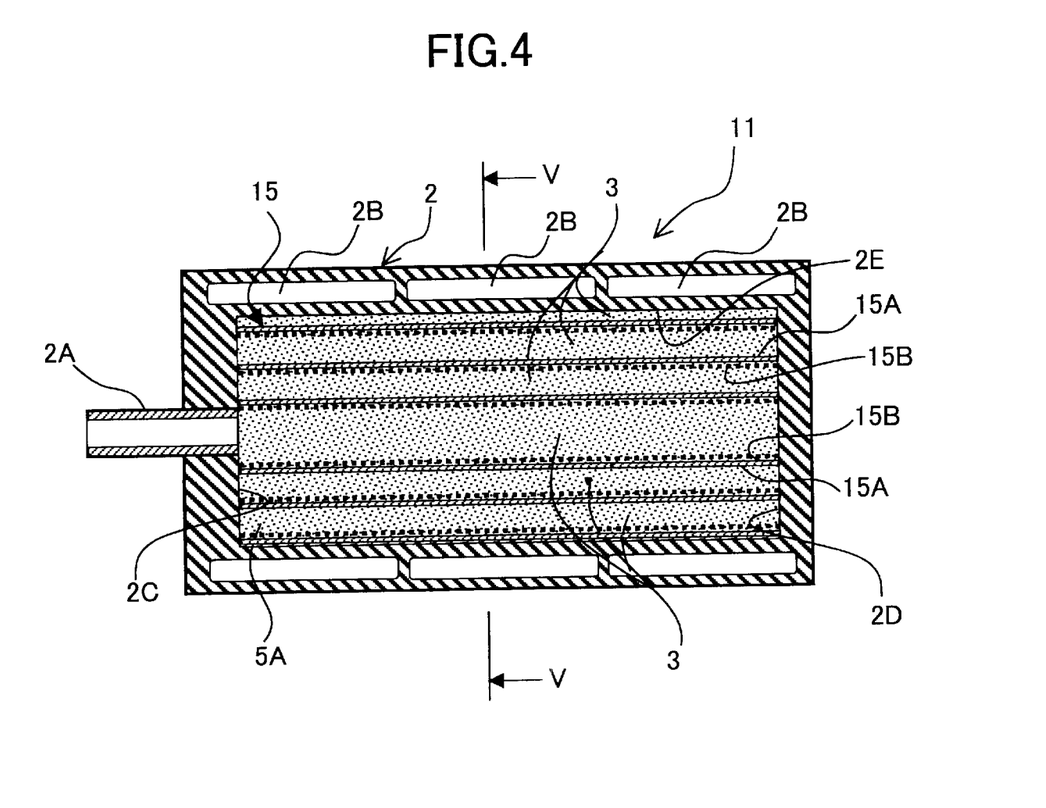
FIG. 4 is a longitudinal section view illustrating the inner structure of the metal hydride tank apparatus according to the second embodiment of the invention.
Figure 5:
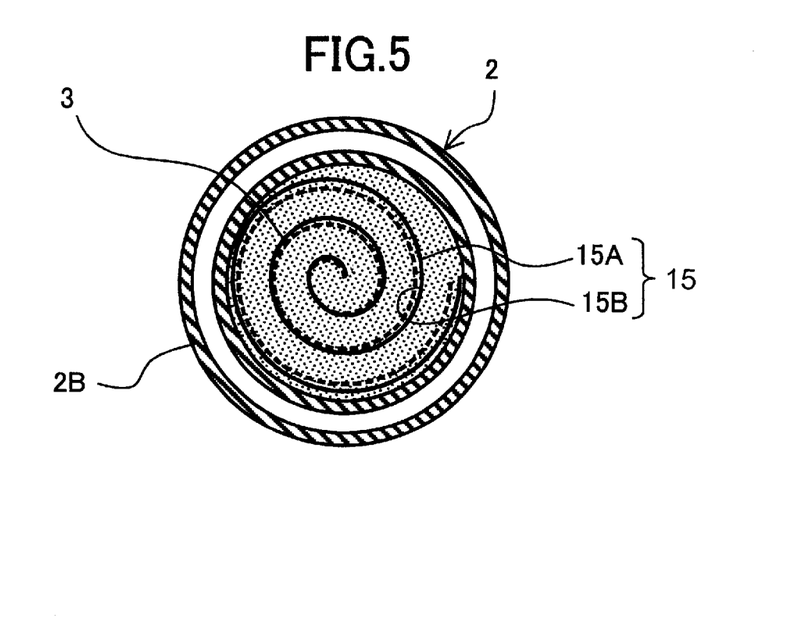
FIG. 5 is a cross section view of the metal hydride tank apparatus for line V—V of FIG. 4.

FIG. 4 and FIG. 5 show a metal hydride tank apparatus 11 according to the second embodiment of the invention. The Metal hydride tank 11 replaces the cylinder-like baffles 5A, 5B and 5C with a spiral-like baffle 15. In the explanation of the metal hydride tank 11 according to the second embodiment, the details will be omitted for the same items as those for the first embodiment described before, with giving the same symbols.

As shown in FIG. 5, the spiral-like baffle 15 of the metal hydride tank apparatus 11 according to the second embodiment of the invention has a spiral-like section in the cross section normal to the longitudinal direction of the tank 2. The spiral-like baffle 15 is made of a thin aluminum sheet 15A as a hydrogen impermeable material jointed with a mesh spring 15B as an elastic material, thereby contacting to the inner circumferential wall 2E of the tank 2 elastically with the radial elasticity. As shown in FIG. 4, both ends of the spiral-like baffle 15 contact to the inner side walls of 2C and 2D of the tank 2. Further, the center of the spiral-like baffle 15 is connected to the inlet/outlet 2A of the tank 2.

In the metal hydride tank apparatus 11 according to the second embodiment of the invention, the hydrogen gas flows into one end of the tank 2 through the inlet/outlet 2A, when the inlet/outlet 2A is connected to a hydrogen loading facility (not shown). The hydrogen gas is spirally guided from the center to periphery of the spiral baffle 15 and stored in throughout the metal hydride 3. A coolant, which has radiated at the heat exchanger of the fuel cell system (not shown), circulates in the water jacket 2B of the tank 2 as a cooling medium for the metal hydride 3. Therefore, the metal hydride 3 is cooled by the inner circumferential wall 2E of the tank 2, thus storing the hydrogen gas continuously with the promotion of the exothermic reaction resulting from the hydrogen gas absorption.

In the metal hydride tank apparatus 11, where the hydrogen gas is stored in throughout the metal hydride 3, the stored hydrogen gas is discharged out of the tank 2 and supplied to the fuel cell, when the inlet/outlet 2A is connected to the fuel cell of the fuel cell system (not shown). A coolant, which has absorbed heats from the fuel cell with the cooling apparatus of the fuel cell system (not shown), circulates in the water jacket 2B of the tank 2 as a heating medium for the metal hydride 3. Therefore, the metal hydride 3 is heated by the inner circumferential wall 2E of the tank 2, thus discharging the hydrogen gas continuously with the promotion of the endothermic reaction resulting from the hydrogen gas discharge.

In the metal hydride tank apparatus 11 according to the second embodiment of the invention, the hydrogen gas discharged from the metal hydride 3 will flow through the hydrogen gas flow channel formed into sections by the spiral-like baffle 15, and go out of the tank 2. In this hydrogen gas discharging process, the metal hydride 3 contained near the inner circumferential wall 2E of the tank 2 is heated by the inner circumferential wall 2E to start discharging the hydrogen gas. The hydrogen gas discharged near the inner circumferential wall 2E of the tank 2 absorbs the heats from the inner circumferential wall 2E efficiently, moving around the inner circumferential wall 2E rapidly guided by the outer portion of the spiral-like baffle 15. The sufficiently heated hydrogen gas flows spirally toward the center of the tank 2 with the spiral-like baffle 15, thereby flowing throughout the metal hydride 3 to heat the metal hydride 3 rapidly. Therefore, the metal hydride 3 will discharge the hydrogen gas from throughout the metal hydride 3 efficiently and rapidly.

The metal hydride tank apparatus 11 according to the second embodiment of the present invention achieves the same effects as the metal hydride tank apparatus 1 according to the first embodiment. In the metal hydride tank apparatus 11, the spiral-like baffle 15 increases the contact ratio to the inner circumferential wall 2E of the tank 2 to improve the thermal conduction between the spiral-like baffle 15 and the inner circumferential wall 2E of the tank 2 with the elastic structure of the spiral-like baffle 15. Also the spiral-like baffle 15 permits the expansion of the metal hydride 3 in storing the hydrogen gas with the elasticity.

Figure 6:
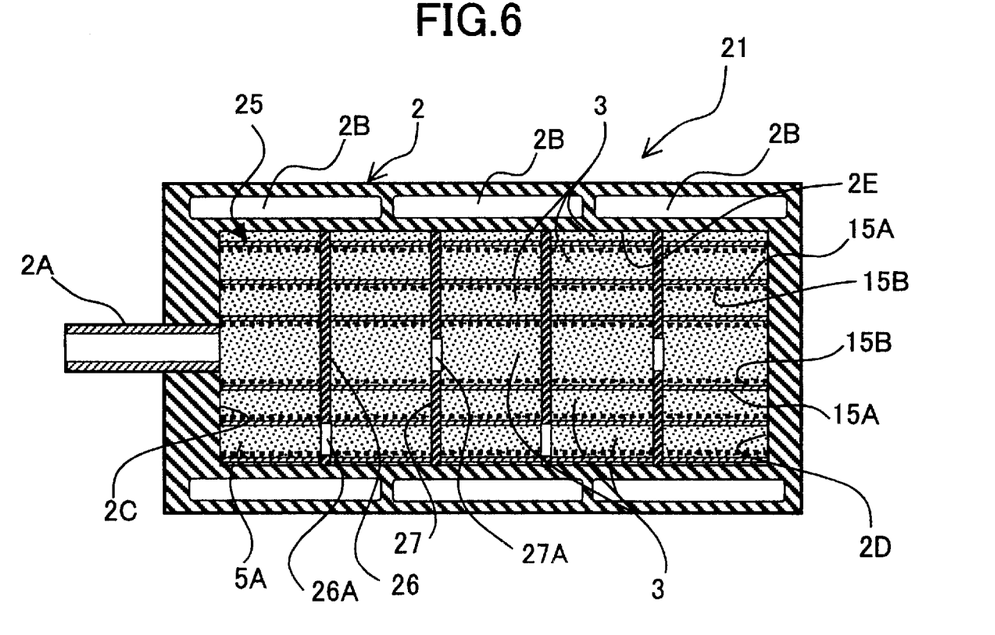
FIG. 6 is a longitudinal section view illustrating the inner structure of the metal hydride tank apparatus according to the third embodiment of the invention.
Figure 7:
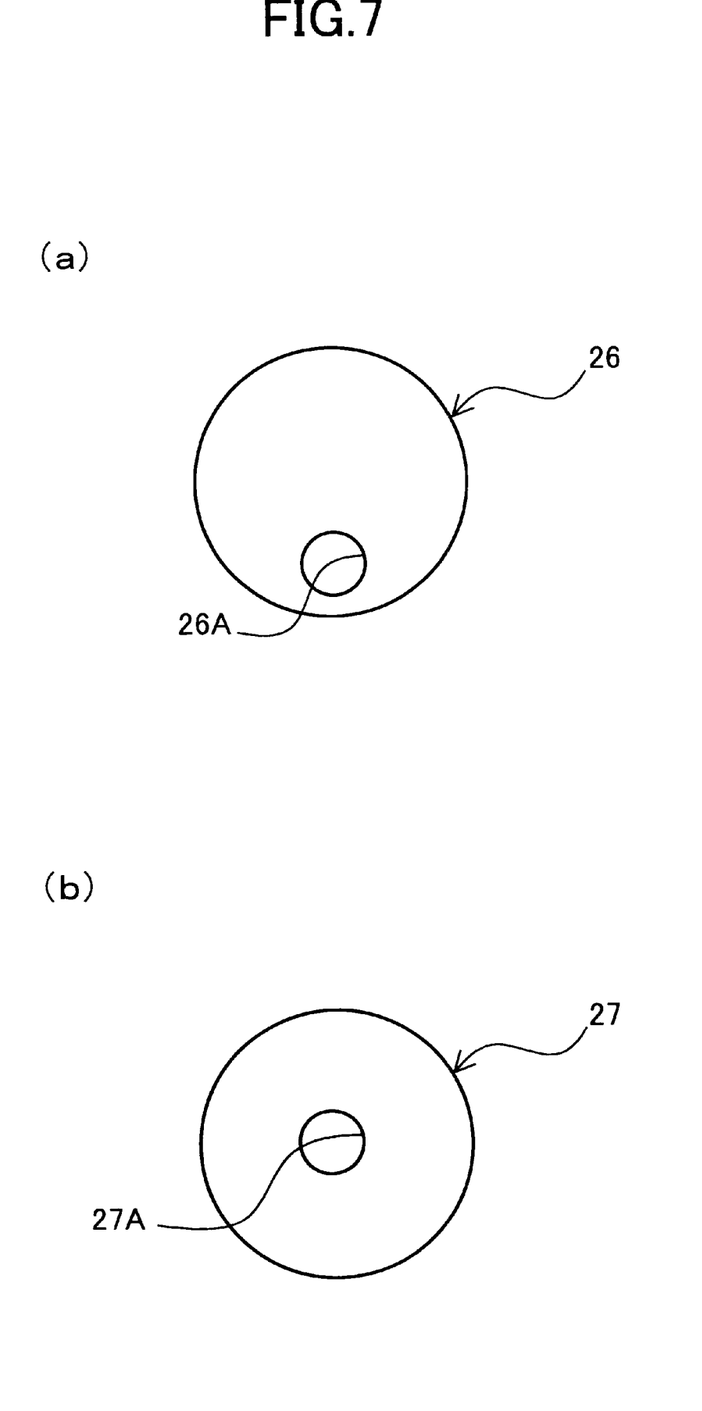
FIG. 7 is a top view showing the partition shown in FIG. 6.

FIG. 6 and FIG. 7 show a metal hydride tank apparatus 21 according to the third embodiment of the present invention. The metal hydride tank apparatus 21 has a plurality of spiral-like baffles 25, which are made by dividing the spiral-like baffle 15 according to the second embodiment in the longitudinal direction. In the explanation of the metal hydride tank apparatus 21 according to the third embodiment, the details will be omitted for the same items as those for the metal hydride tank apparatus 11 according to the second embodiment described before, with giving the same symbols.

In the metal hydride tank apparatus 21 according to the third embodiment, disk-like partitions 26, 27 are disposed between the spiral-like baffles 25. The partitions 26, 27 are made of aluminum plates, which are of the hydrogen impermeable material. The partition 26 has a connecting hole 26A in its periphery; on the other hand the partition 27 has a connecting hole 27A in its center.

In the metal hydride tank apparatus 21 according to the third embodiment, the hydrogen gas coming into one end of the tank 2 through the inlet/outlet 2A is spirally guided in the radial direction from the center of the spiral-like baffle 25, and flows into the second spiral-like baffle 25 through the connecting hole 26A of the partition 26. Subsequently, the hydrogen gas flows into the third baffle 25 through the connecting hole 27A of the partition 27, then flowing into the fourth and fifth baffles 25 in the same manner. This way, the hydrogen gas will be stored in throughout the metal hydride 3.

In the metal hydride tank apparatus 21 according to the third embodiment of the invention, the hydrogen gas discharged from the metal hydride 3 will flow through the hydrogen gas flow channel formed into sections by the respective spiral-like baffles 25, and go out of the tank 2. In this hydrogen gas discharging process, the metal hydride 3 contained near the inner circumferential wall 2E of the tank 2 is heated by the inner circumferential wall 2E to start discharging the hydrogen gas. The hydrogen gas discharged near the inner circumferential wall 2E of the tank 2 absorbs the heats from the inner circumferential wall 2E efficiently, moving around the inner circumferential wall 2E rapidly guided by the outer portion of the spiral-like baffle 25. The sufficiently heated hydrogen gas travels from the fifth to first spiral-like baffle 25, spirally flowing from its periphery to center or vice versa within the respective spiral-like baffles, thereby flowing throughout the metal hydride 3 to heat the metal hydride 3 rapidly. Therefore, the metal hydride 3 will discharge the hydrogen gas from throughout the metal hydride 3 efficiently and rapidly. Therefore, the metal hydride tank apparatus 21 according to the third embodiment will achieve the same effects as the metal hydride tank 11 according to the second embodiment.

Figure 8:
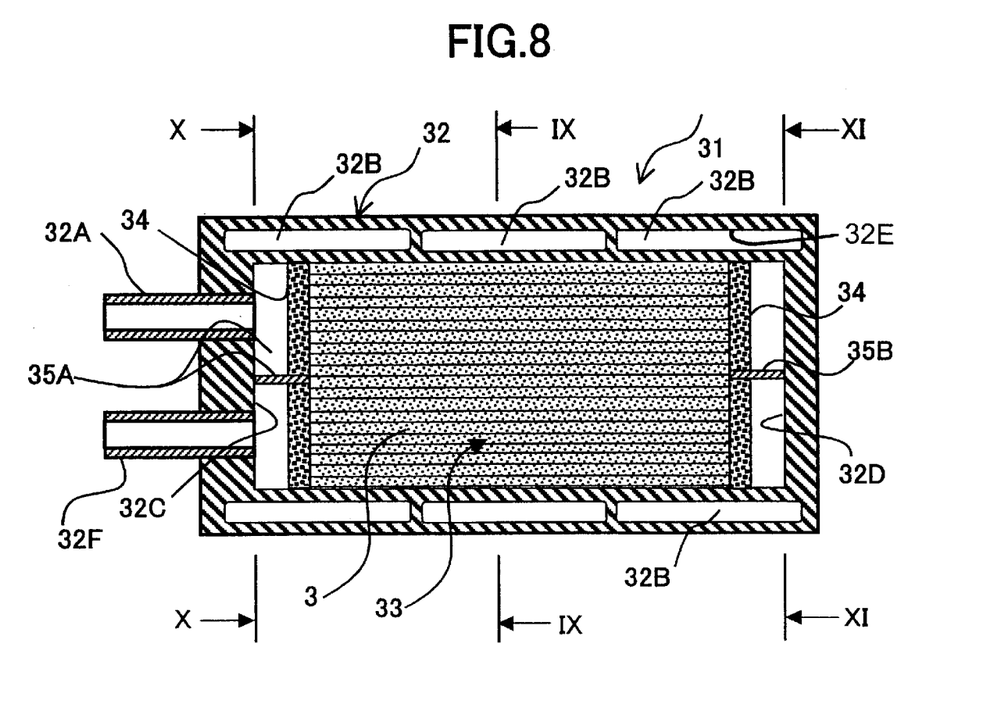
FIG. 8 is a longitudinal section view illustrating the inner structure of the metal hydride tank apparatus according to the fourth embodiment of the invention.
Figure 9:
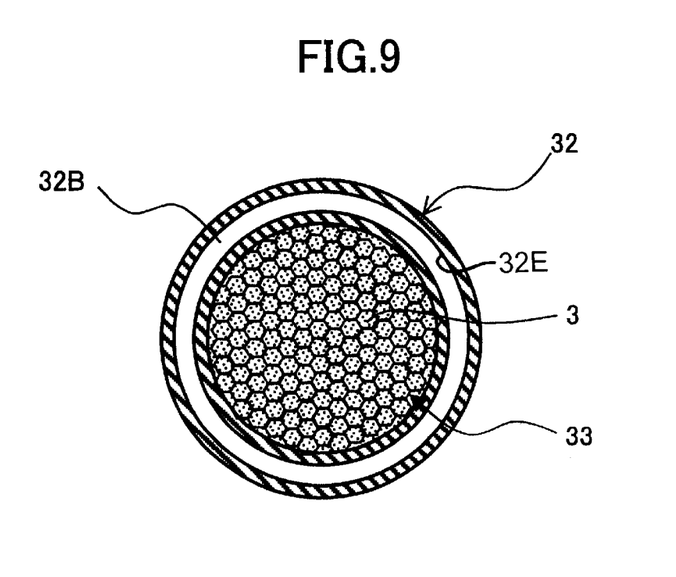
FIG. 9 is a cross section view of the metal hydride tank apparatus for line IX—IX of FIG. 8.
Figure 10:
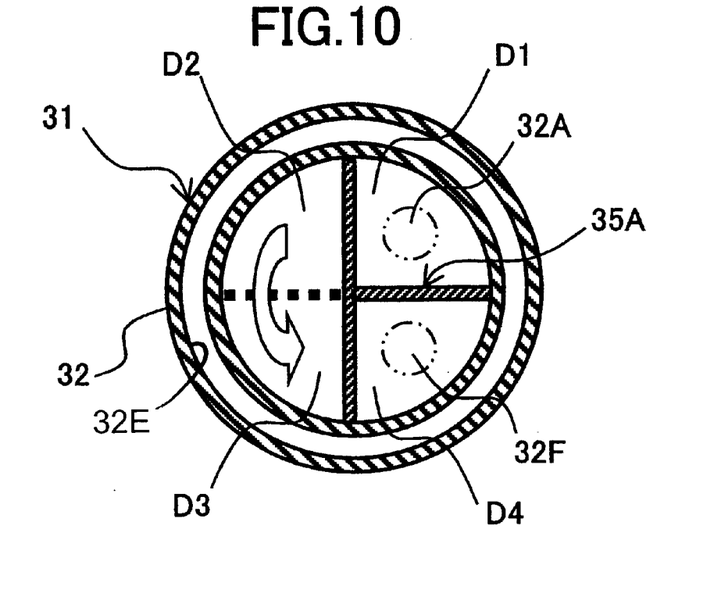
FIG. 10 is a view showing the end face for line X—X of FIG. 8.
Figure 11:
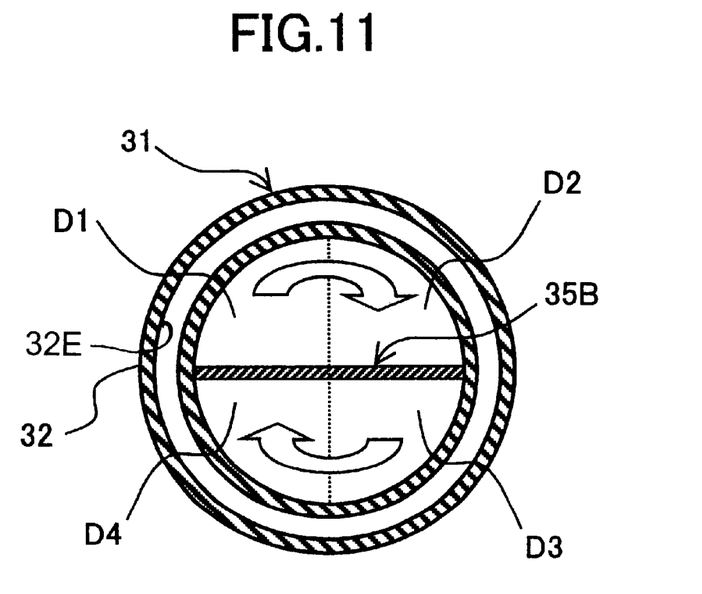
FIG. 11 is a view showing the end face for line XI—XI of FIG. 8.

FIGS. 8 through 11 show a metal hydride tank apparatus 31 according to the fourth embodiment of the present invention. As shown in FIG. 8, the metal hydride tank apparatus 31 has a honeycomb structured holder 33 in a tank 32, which contains the metal hydride 3. Like the tank 2 of the metal hydride tank apparatus 1 according to the first embodiment, the metal hydride tank 32 includes a water jackets 32B similar to the water jacket 2B of the tank 2. However, an inlet 32A and outlet 32F are opened at one end of the tank 32 instead of the inlet/outlet 2A. As shown in FIG. 10, the inlet 32A is placed in a first section D1 and the outlet 32F is placed in an adjoining fourth section D4, when one end of the tank 32 is divided cross wise into the four sections.

As shown in FIG. 8, the holder 33 is contained in the tank 32 so that the longitudinal direction of honeycomb flow channel lies in the longitudinal direction of the tank 32. The same filters 34 as those of the metal hydride tank apparatus 1 according to the first embodiment are fixed to both ends of the holder 33. Hydrogen gas flow spaces are provided between one filter 34 and one inner side wall 32C of the tank 32, and between another filter 34 and another inner side wall 32D.

One plate-like baffle 35A, which contacts to one inner side wall 32C of the tank 32, is provided outside one filter 34 so as to have four hydrogen gas flow channels sectioned in the holder 33. On the other hand, the other plate-like baffle 35B, which contacts to the other inner sidewall 32D of the tank 32, is provided outside the other filter 34. One plate-like baffle 35A is placed in a T-shaped manner shown in FIG. 10, separating the first section D1 connected to the inlet 32A from the fourth section D4 connected to the outlet 32F, and connecting the second section D2 next to the first section D1 and the third section D3 next to the fourth section D4. The other plate-like baffle 35B is placed in an I-shaped manner shown in FIG. 11, connecting the first and second sections D1, D2, also separating the first and second sections D1, D2 from the third and fourth sections D3, D4.

In the metal hydride tank apparatus 31 according to the fourth embodiment of the invention, the hydrogen gas flows into one end of the tank 32 through the inlet 32A, when the inlet 32A is connected to the high pressure hydrogen gas tank (not shown). The hydrogen gas travels from one end to the other within the first section D1 of the holder 33 divided by the plate-like baffle 35A shown in FIG. 10, and then flows into the second section D2 from the first section D1. The hydrogen gas coming into the second section D2 travels back from one end to the other in the holder 33, flowing into the third section D3 from the second section D2. The hydrogen gas coming into the third section D3 travels from one end to the other in the holder 33, flowing into the fourth section D4 from the third section D3. The hydrogen gas coming into the fourth section D4 travels back from one end to the other in the holder 33. The hydrogen gas coming into the tank 32 is thus stored in throughout the metal hydride 3. A coolant, which has radiated at the heat exchanger of the fuel cell system (not shown), circulates in the water jacket 32B of the tank 32 as a cooling medium for the metal hydride 3. Therefore, the metal hydride 3 is cooled by the inner circumferential wall 32E of the tank 32, thus storing the hydrogen gas continuously with the promotion of the exothermic reaction resulting from the hydrogen gas absorption.

In the metal hydride tank apparatus 31, in which the hydrogen gas is stored in throughout the metal hydride 3, the stored hydrogen gas is discharged out of the tank 32 and supplied to the fuel cell, when the outlet 32F is connected to the fuel cell of the fuel cell system (not shown). A coolant, which has absorbed heats from the fuel cell with the cooling apparatus of the fuel cell system (not shown), circulates in the water jacket 32B of the tank 32 as a heating medium for the metal hydride 3. Therefore, the metal hydride 3 is heated by the inner circumferential wall 32E of the tank 32, thus discharging the hydrogen gas continuously with the promotion of the endothermic reaction resulting from the hydrogen gas discharge.

In the metal hydride tank apparatus 31 according to the fourth embodiment of the invention, the hydrogen gas discharged from the metal hydride 3 will rapidly travels back and forth through the long hydrogen gas flow channel and go out of the tank 32 through the outlet 32F. The hydrogen gas sequentially flows through the first, second, third and fourth sections D1, D2, D3, and D4 of the holder 33, which are divided by the plate-like baffles 35A and 35B. In this hydrogen gas discharging process, the metal hydride 3 contained near the inner circumferential wall 32E of the tank 32 is heated by the inner circumferential wall 32E to start discharging the hydrogen gas. The hydrogen gas discharged near the inner circumferential wall 32E of the tank 32 absorbs the heats from the inner circumferential wall 32E efficiently, moving along the inner circumferential wall 32E rapidly guided by the respective honeycomb flow channels of the holder 33. The sufficiently heated hydrogen gas travels the respective hydrogen gas channels of the first through fourth sections in the holder 33, flowing fast throughout the metal hydride 3 to heat up the metal hydride 3 rapidly. Therefore, the metal hydride 3 will discharge the hydrogen gas from throughout the metal hydride 3 efficiently and rapidly. Therefore, the metal hydride tank apparatus 31 according to the fourth embodiment will achieve the same effects as the metal hydride tank 1 according to the first embodiment.

In the metal hydride tank apparatus 31 according to the fourth embodiment, the hydrogen gas may be flowed into the tank 32 from the hydrogen loading facility (not shown) through the outlet 32F, after the hydrogen gas stored in the metal hydride 3 has been discharged through the outlet 32F. This way the hydrogen gas can be discharged uniformly since the temperature of the tank 32 is made uniform by interchanging the inlet 32A and outlet 32F. The interchange will also prevent the local degradation of the metal hydride 3 resulting from hydrogen gas storing and discharging.

As a way of controlling the tank temperature of the metal hydride tank apparatus according to the invention, electrical heaters, combustion heats generated by combustion of hydrogen or methanol with a catalytic combustion device etc. ,and heat storage material or heat generating material may be employed. Any type of heat transfer, conduction, radiation or convection may be applied directly or indirectly.

What is claimed is:

1. A metal hydride tank apparatus forming a temperature controllable tank, comprising a metal hydride adapted to store and to discharge a hydrogen gas according to the temperature of the tank; a gas channel for discharging the hydrogen gas, discharged from the metal hydride, out of said tank; and a baffle placed in the tank for separating said gas channel into sections in order to flow the hydrogen gas throughout the metal hydride in the tank and to discharge the hydrogen gas out of the tank.

2. The metal hydride tank apparatus according to claim 1, wherein said baffle has a cylinder-like shape and is adapted to be positioned along a longitudinal direction of said tank.

3. The metal hydride tank apparatus according to claim 1, wherein said baffle has a spiral-like shape.

4. The metal hydride tank apparatus according to claim 1, further comprising a honeycomb structured holder containing said metal hydride placed along a longitudinal direction of said tank, wherein a baffle is placed at both ends of the holder to separate said gas channel into sections.

5. The metal hydride tank apparatus according to claim 1, wherein said baffle is made of a hydrogen impermeable material.

6. The metal hydride tank apparatus according to claim 1, wherein said baffle is made of an elastic material.

7. A metal hydride tank apparatus forming a temperature controllable tank, comprising:

a metal hydride adapted to store and to discharge a hydrogen gas according to the temperature of the tank;

a gas channel for discharging the hydrogen gas, discharged from the metal hydride, out of said tank; and a baffle placed in the tank for separating said gas channel into a plurality of sections in order to flow the hydrogen gas throughout the metal hydride disposed in the plurality of sections and to discharge the hydrogen gas out of the tank.

8. A metal hydride tank apparatus forming a temperature controllable tank, comprising:

a metal hydride adapted to store and to discharge a hydrogen gas according to the temperature of the tank;

a gas channel for discharging the hydrogen gas, discharged from the metal hydride, out of an outlet of said tank; and a baffle for forming the gas channel placed in the tank, wherein at least an end of the baffle contacts a side wall of the tank having the outlet so that the gas channel flowing the hydrogen gas discharged from the metal hydride along the baffle can be formed.

9. A metal hydride tank apparatus forming a temperature controllable tank, comprising:

a metal hydride adapted to store and to discharge a hydrogen gas according to the temperature of the tank;

a gas channel for discharging the hydrogen gas, discharged from the metal hydride, out of an outlet of said tank; and baffles for forming the gas channel placed in the tank, wherein each baffle has a cylinder-like shape and a different diameter and the baffles are disposed coaxially in the tank, wherein an end of a first baffle with the smallest diameter contacts a side wall of the tank having the outlet and the other end of the first baffle is placed apart from the other side wall, and a second baffle is disposed reversely relative to the first baffle in terms of geometric relation to the side walls.

10. A metal hydride tank apparatus forming a temperature controllable tank, comprising:

a metal hydride adapted to store and to discharge a hydrogen gas according to the temperature of the tank;

a gas channel for discharging the hydrogen gas, discharged from the metal hydride, out of an outlet of said tank; and a baffle for forming the gas channel placed in the tank;

wherein the baffle has a spiral-like shape and both ends of the baffle contact side walls of the tank, and wherein the outlet is placed in a center of the baffle.

11. The metal hydride tank apparatus of claim 10, wherein the baffle is separated in a longitudinal direction by partitions having a hole.

12. A metal hydride tank apparatus forming a temperature controllable tank, comprising:

a metal hydride adapted to store and to discharge a hydrogen gas according to the temperature of the tank;

a gas channel for discharging the hydrogen gas, discharged from the metal hydride, out of said tank;

baffles for forming the gas channel placed in the tank;

an inlet and an outlet for the hydrogen gas; and a holder containing the metal hydride placed along a longitudinal direction of the tank, wherein a baffle is placed at each end of the holder so as to form a path from the inlet to outlet for the hydrogen gas through the gas channel.

* * * * *